United States Patent [19]

Borgren

[11] 4,241,579
[45] Dec. 30, 1980

[54] APPARATUS FOR PRODUCING ELECTRICAL ENERGY FROM MULTIDIRECTIONAL WATER WAVE ACTION

[75] Inventor: Peter M. Borgren, Duluth, Minn.

[73] Assignee: Hydrodynamic Energy Systems Corporation, Duluth, Minn.

[21] Appl. No.: 942,339

[22] Filed: Sep. 14, 1978

[51] Int. Cl.³ .............................................. F03B 13/12
[52] U.S. Cl. ........................................ 60/504; 60/507
[58] Field of Search ............................. 60/497–507; 290/53; 417/331

[56] References Cited

U.S. PATENT DOCUMENTS

| 997,663 | 8/1911 | Ford | 60/507 X |
|---|---|---|---|
| 1,073,682 | 9/1913 | Henderson | 60/499 |
| 1,292,223 | 1/1919 | Anell | 60/504 |
| 1,346,399 | 7/1920 | Crawford-Frost | 60/504 |

FOREIGN PATENT DOCUMENTS

291265  5/1928  United Kingdom ........................ 60/501

Primary Examiner—Allen M. Ostrage
Attorney, Agent, or Firm—Schwartz, Jeffery, Schwaab, Mack, Blumenthal & Koch

[57] ABSTRACT

An apparatus for producing electrical energy from multidirectional water wave action including a central support for placement on the bottom of a body of water with the support extending vertically above the surface of the water. A multiplicity of shafts extend radially and horizontally from the central support. A multiplicity of floats are supplied for each shaft with an elongated member connected at the upper end to each float and in engagement with a weight connected to the lower end of each elongated member and extending below the shaft. A one way clutch is mounted on each of said shafts and associated with each of said elongated members intermediate the ends thereof adapted to rotate each shaft in one direction when the float raises on a wave and not affect the shafts when said floats lower in a trough between waves. Each of said shafts is connected to electrical generating means for actuation of the same.

11 Claims, 14 Drawing Figures

APPARATUS FOR PRODUCING ELECTRICAL ENERGY FROM MULTIDIRECTIONAL WATER WAVE ACTION

SUMMARY

The invention relates to an improvement in an apparatus for producing electrical energy from multi-directional water wave action in a body of water.

It is an object of the invention to provide an apparatus having a central support from which emanates radially a multiplicity of pairs of shafts. The central support has means for adjustably supporting the same upon the bottom of a body of water, and the shafts are adjustably supported by columns that are positioned upon the bottom of the body of water. A multiplicity of floats are provided for each of the shafts together with an elongated member connected at one end to each of the floats and connected to a one way clutch on a shaft for each float with the other end of each elongated member connected to a weight and depending from the one way clutch. The clutch member allows a shaft to be rotated in one direction when a float raises on a wave and not effect shaft rotation when the float lowers on a wave. The shafts are connected to electrical generating means on the central support to actuate the same for the generation of electricity.

In the drawings forming part of this application.

Referring to the drawings in detail, the mechanism for producing electrical energy from water wave action A includes the central support tower 16 which includes the base 18 imbedded in the bottom B of a body of water. The tower 16 includes a pair of spaced outer uprights 20 and 22 connected at the lower ends to the base 18 and the pair of spaced inner uprights 24 and 26 also connected at the lower ends to the base 18. Secured to the uprights 20, 22, 24 and 26 is the intermediate platform 28.

The numeral 30 designates a first elongated housing which is substantially trapezoidal in outline and secured at the lower end thereof to the outer edge of the intermediate plateform 28. A second elongated housing 32 is also provided which is secured at the lower end thereof to the opposite outer edge of the platform 28. The upper end portions of the housings 30 and 32 are connected to the upper platform 34. The upper end of the housing 30 is secured to the generator housing 36 mounted on the platform 34.

R1 designates one of eight radial arm units emanating from the tower 16 all of which are identical so that only one (R) will be described in detail. The other seven radial arm units are designated as R2-R8. The radial arm unit R1 includes the spaced and parallely disposed segmented shafts S and S1 which are identical so that only shaft S will be described in detail. Each radial arm R2-R8 includes a pair of segmented shafts identical to shafts S and S1.

Figures 4, 5, 6:
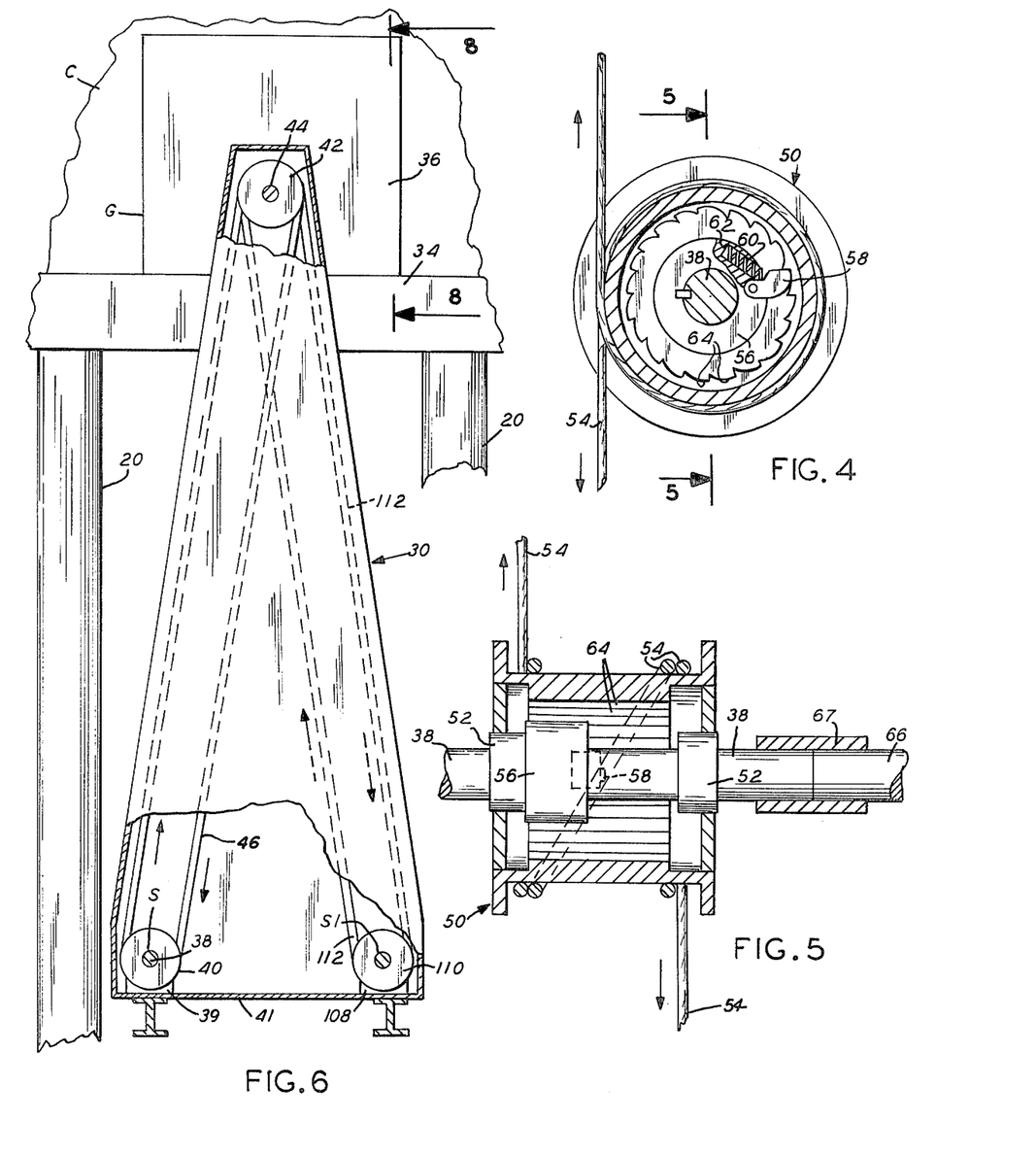
FIG. 4 is a sectional view on the line 4—4 of FIG. 2.
FIG. 5 is a sectional view on the line 5—5 of FIGS. 1 and 4.
FIG. 6 is a sectional view on the line 6—6 of FIG. 2.

The segmented shaft S includes the shaft portion 38 which extends into the housing 30 and has mounted thereon the pulley 40, best seen in FIG. 6, the inner end of the shaft portion 38 being mounted in a conventional bearing 39 on the bottom 41 of housing 30. Further provided is a double pulley 42 mounted on a shaft 44 which forms part of the generator G. A V-belt 46 is mounted on the pulley 40 and the outer half of the double pulley 42.

The shaft segment 38 of shaft S has rotatably mounted thereon a first drum 50 by means of bearings 52 (FIG. 5), and around the drum is positioned an elongated member 54, in the form of a cable. Keyed to the shaft 38 is the dog-holding sleeve 56 on which is pivotally mounted a dog 58 which is urged outwardly by means of a spring 60 mounted in the recess 62 formed in the sleeve 56 (FIG. 4). The drum 50 has formed on the inner surface thereof teeth 64 which are engageable by the dog 58 whereby the drum 50 can rotate the shaft in only one direction through the dog-holding sleeve 56 when the elongated member 54 is operated as hereinafter described. The drum, sleeve and dog form a one way clutch.

As heretofore stated the inner end of the shaft portion 38 is rotatably mounted in the bearing 39. The outer end of the shaft portion is connected to a second shaft portion or segment 66 identical to the first shaft segment 38, and the shaft segments are connected by the collar 67. A second drum 68 with a dog-holding sleeve identical to first drum 50 is carried by shaft segment 66. Identical drums 70 and 72 are also mounted on shaft segments. Shaft segment 66 is connected to shaft segment 74 by collar 76, and shaft segment 74 mounts drum 68 as in the case of first drum 50, reference being made to FIG. 2. Shaft segment 74 is connected to shaft segment 78 by means of collar 80, and shaft segment 78 mounts drum 70. Shaft segment 78 is connected to shaft segment 82 by means of collar 84, and shaft segment 82 mounts drum 72. The outer end of shaft segment 82 is rotatably mounted in double bearings 86 mounted on an upright support 88 the lower end of which is connected to the base 90 imbedded in the bottom of a body of water as in the case of the base 18.

The shaft S and its segmented shaft parts are further supported by an upright support 92 having a bearing 94 mounted on the top portion thereof in which the shaft segment 78 is rotatable. The lower end of the support 92 is mounted on the base 93. The numeral 96 designates a further upright support having a bearing 98 mounted on the top portion thereof in which the shaft segment 74 is rotatable. The lower end of the support 96 is mounted on the base 100 imbedded in the bottom B. The shaft S is additionally supported by an upright support 102 by means of bearing 104 mounted on the upper end of the support 102 in which the shaft segment 66 is rotatable.

The support 102 has secured to the lower end thereof the base 106 which is imbedded in the bottom B.

The upper end of the cable 54 wrapped around the drum 50 is attached to the float F. Identical cables 54a, 54b and 54c are wound around the drums 68, 70 and 72, respectively, and connected to the upper ends thereof are the floats Fa, Fb and Fc, respectively. Secured to lower end of the cable 54 is a weight W and secured to the lower ends of the cables 54a, 54b and 54c are the weights Wa, Wb and Wc, respectively. The length of the various cables are such that a sufficient number of windings are made about the clutch drums whereby accommodation is made for different heights of waves.

Figure 1:
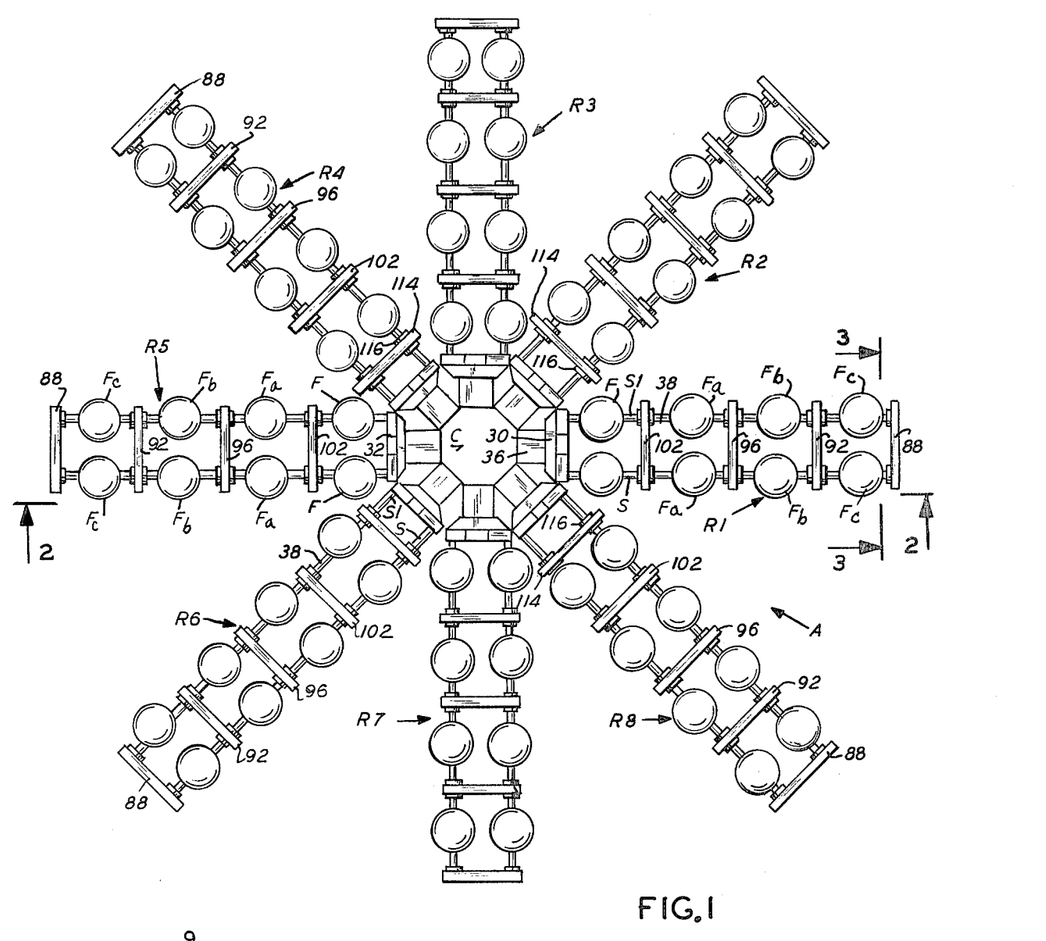
FIG. 1 is a top plan view of an apparatus for producing electrical energy from water wave action which embodies the invention.

As will be noted in FIG. 1, segmented shaft S1, is also rotatably mounted in the supports and is identical to segmented shaft S, both of which make up the radial arm unit R identical to which are the radial arm units R2-R8. Depending upon the prevailing direction of the wind and the wave formations, the linear radial extent of the arm units may be varied. Due to the circular nature of the apparatus A, the apparatus is effected and operated no matter what direction the wind is from.

With reference in particular to FIG. 6 the inner end of the segmented shaft S1 is mounted in a bearing 108 mounted on the bottom 41 of housing 30, and on the shaft a pulley 110 is mounted. Mounted on the pulley 110 is a V-belt 112 which is also mounted on the double pulley 42 on shaft 44 of generator G.

The various clutch drums 50, etc. with the ratchet construction are so positioned that the shafts S and S1 rotate in the same direction, as can be seen in FIG. 6, whereby the shaft 44 of generator G is rotated in a single direction to operate the same.

Figures 7, 8, 9:
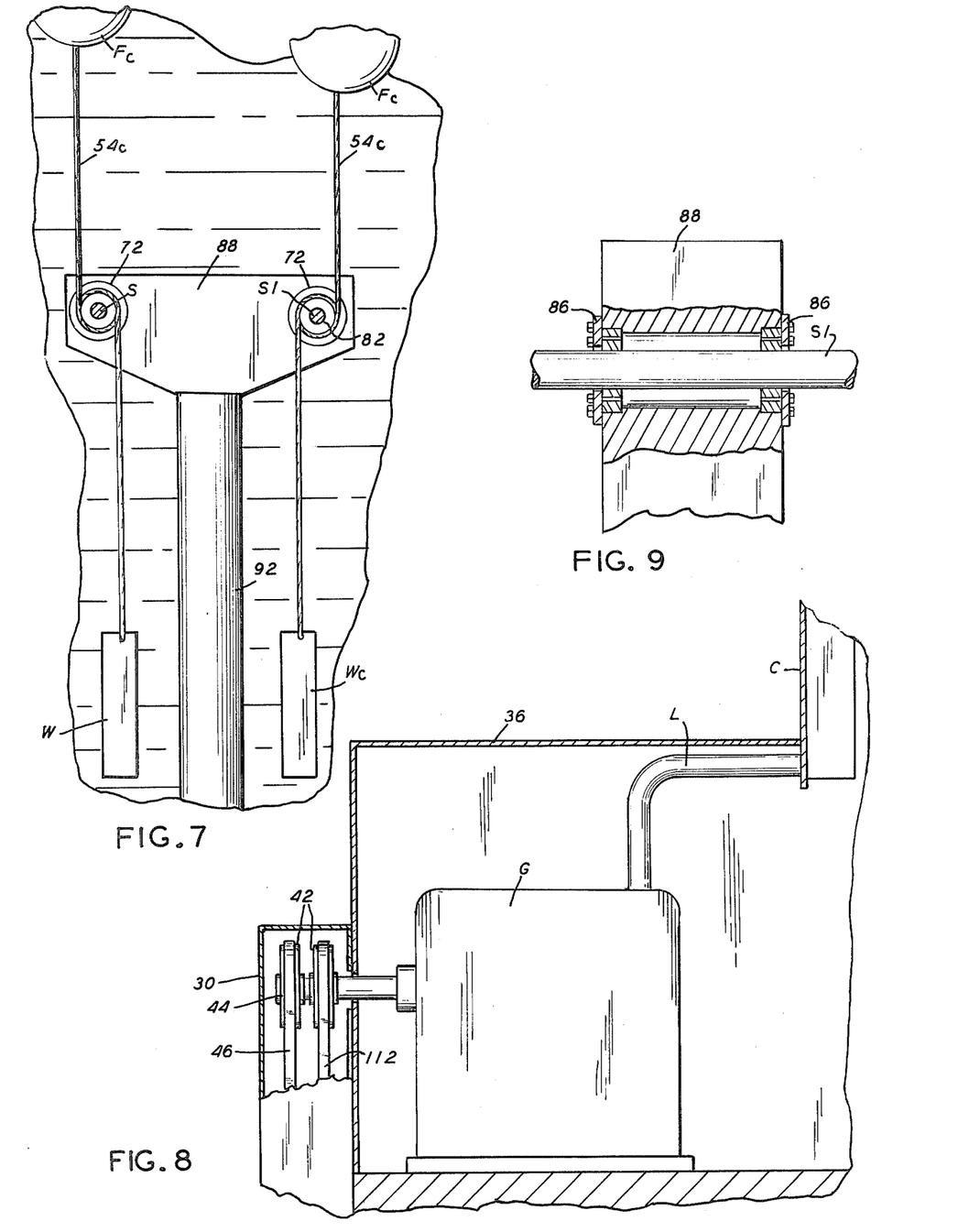
FIG. 7 is a sectional view on the line 7—7 of FIG. 2.
FIG. 8 is a sectional view on the line 8—8 of FIG. 6.
FIG. 9 is a sectional view on the line 9—9 of FIG. 3.

Each of the radial arm units R2-R8 drives a generator in the identical manner as does the arm unit R1, and all the generators are connected by means of a line such as L, FIG. 8 to a control center C mounted on the upper platform 34. A conventional power line leads from the control center C to a station on the shoreline.

Figure 2:
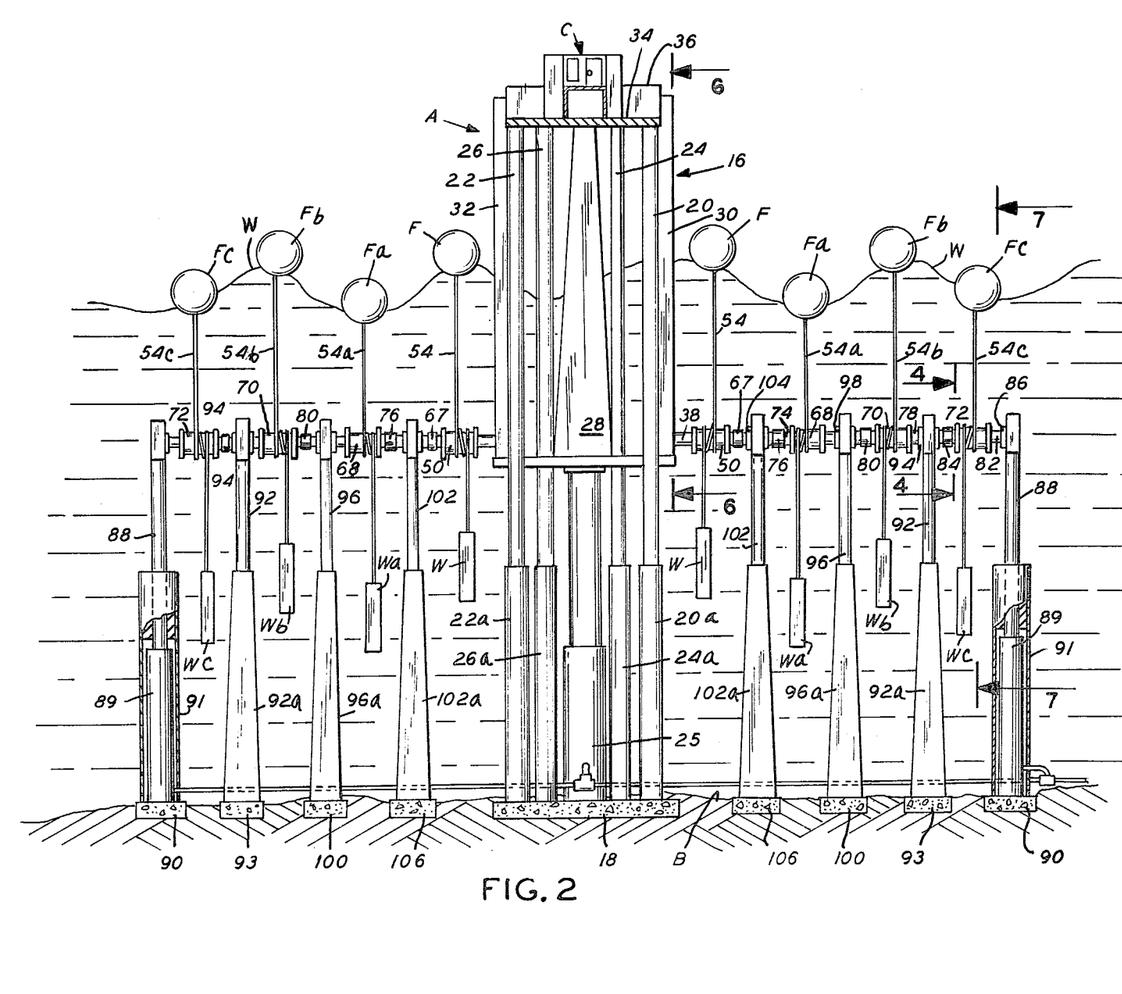
FIG. 2 is a sectional view on the line 2—2 of FIG. 1.
Figure 3:
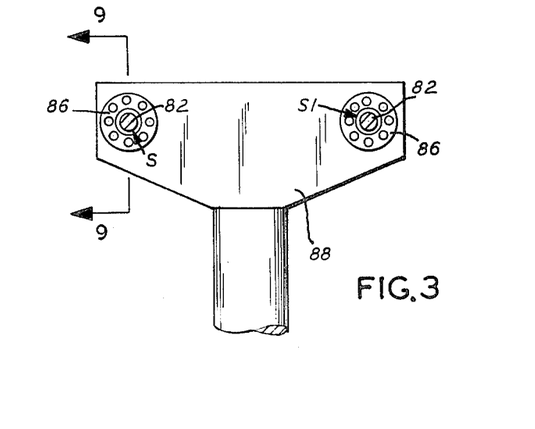
FIG. 3 is a sectional view on the line 3—3 of FIG. 1.

The central tower and all of the shafts and shaft supporting structure can be raised and lowered to accommodate large or small waves by means of a hydraulic cylinder 25, FIG. 2, located centrally under the tower in conjunction with outrigger cylinders 89. Bases 91 support the standards 88 for telescoping movement into the cylinders 89. All other standards 92-102 telescope into their bases. Standard 92 telescopes into base portion 92a, 92 into 96a, and 102 into 102a. Standards 114, shown in FIG. 1 and identical to the standards 102, are located inboard of the radial units R2, R4, R6 and R8. The standards 114 are spaced outward from the tower and provide additional support. The shaft 38 extends through bearings 116 mounted on the standards 114. The standards 114 telescope into their lower portion which are supported on a base, not shown, on the bottom B.

Figure 10:
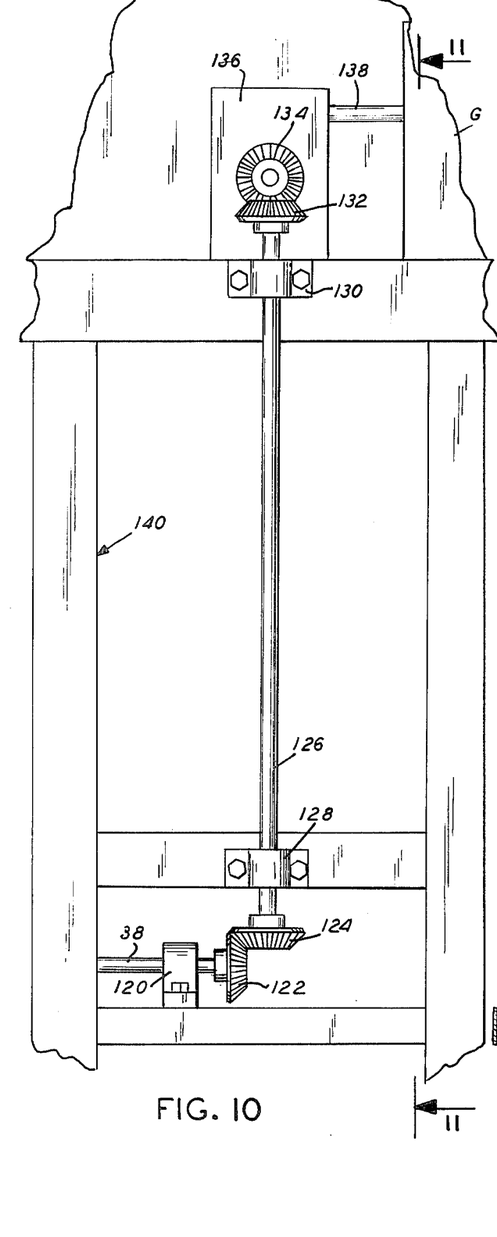
FIG. 10 is a further embodiment of the shaft drive means for the generators.
Figure 11:
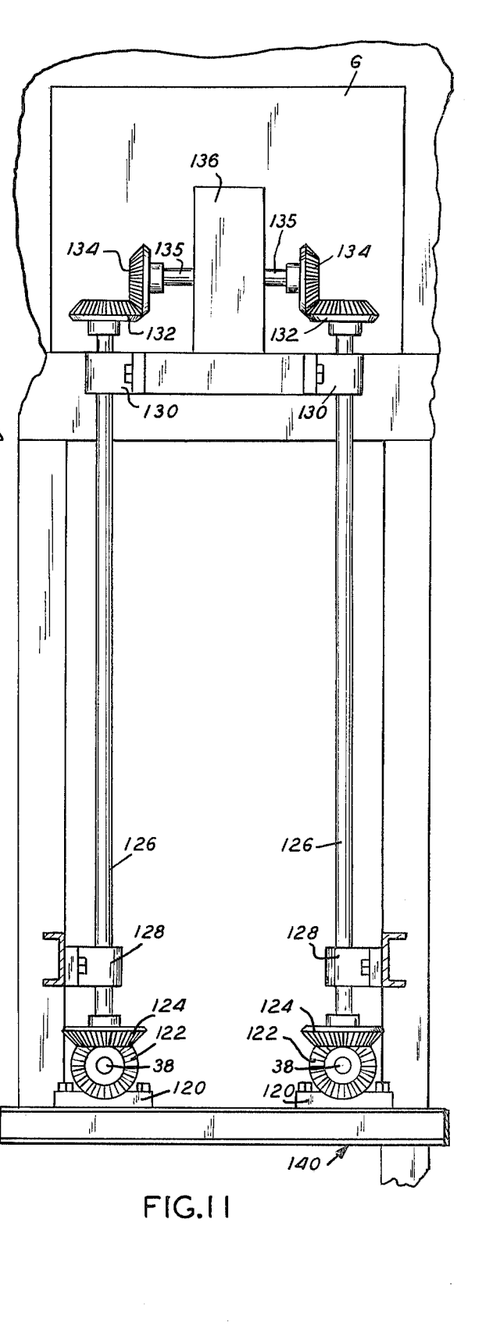
FIG. 11 is a sectional view on the line 11—11 of FIG. 10.

An alternate means of power transmission from the shafts S and S1 to the generator housing 36 embodies the use of shafts and gears as is shown in FIGS. 10 and 11. The shaft 38 is mounted in bearing 120 and a bevel gear 122 is secured to the end of shaft 38. The gear 122 is matched to bevel gear 124 which is secured to the lower end of shaft 126, which shaft is journaled in bearings 128 and 130. The upper end of shaft 126 has secured thereto the bevel gear 132 which is matched to gear 134. Gear 134 is secured to the shaft 135 which leads into the gear box 136. The output shaft 138 from the gear box 136 drives a generator G in the generator housing 36.

Suitable support structure 140 is provided to mount the bearings and shafts.

Figure 12:
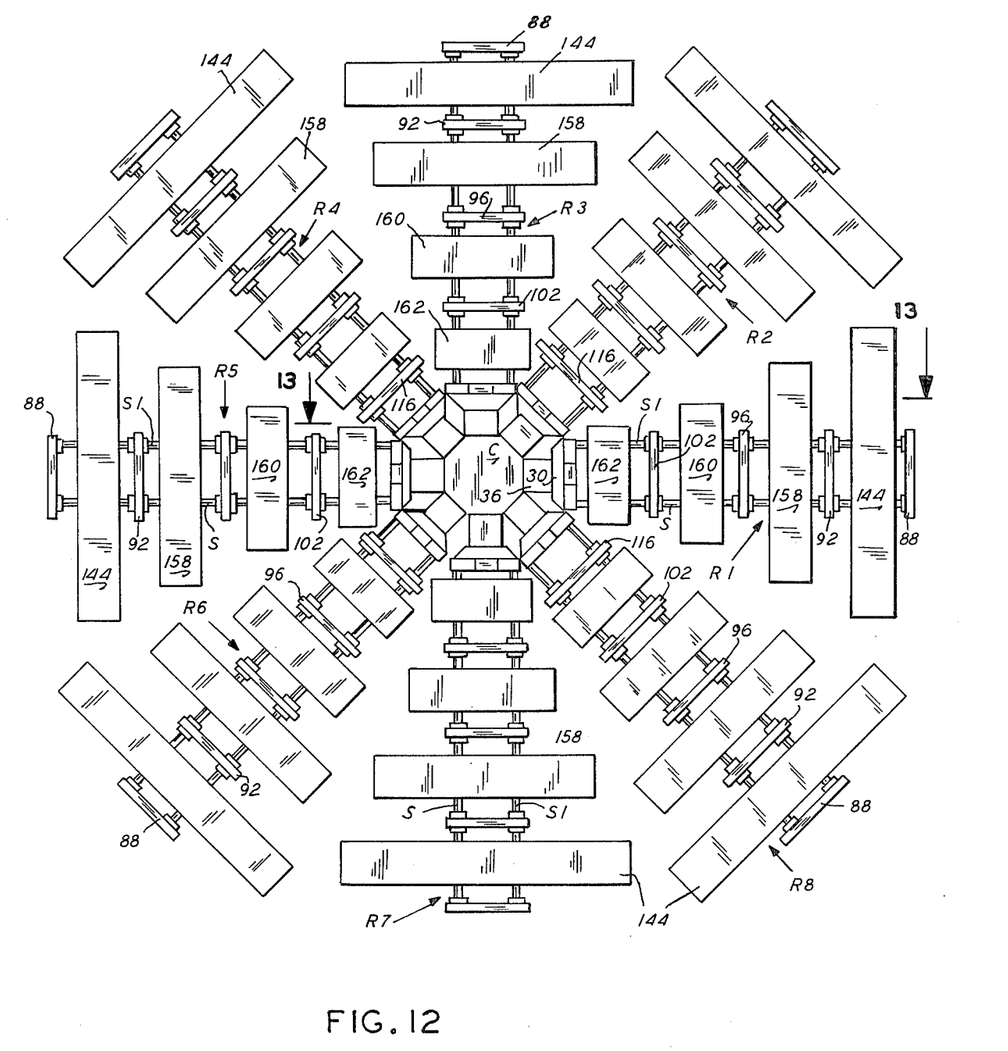
FIG. 12 is a top plan view of a further embodiment of the apparatus shown in FIG. 1.
Figure 13:
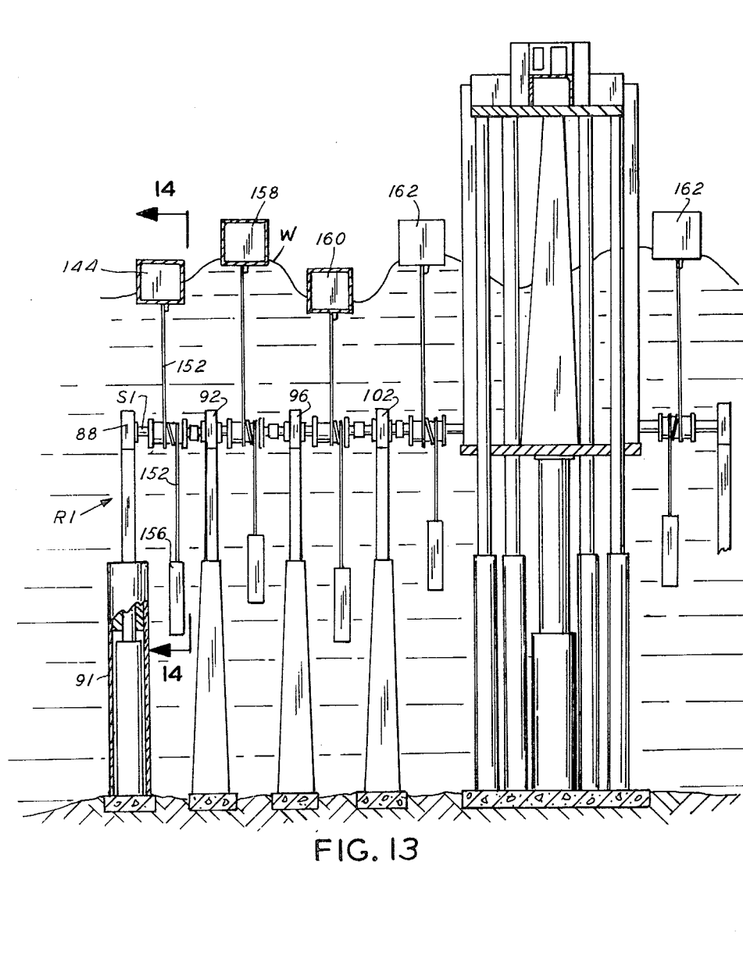
FIG. 13 is a sectional view on the line 13—13 of FIG. 12.
Figure 14:
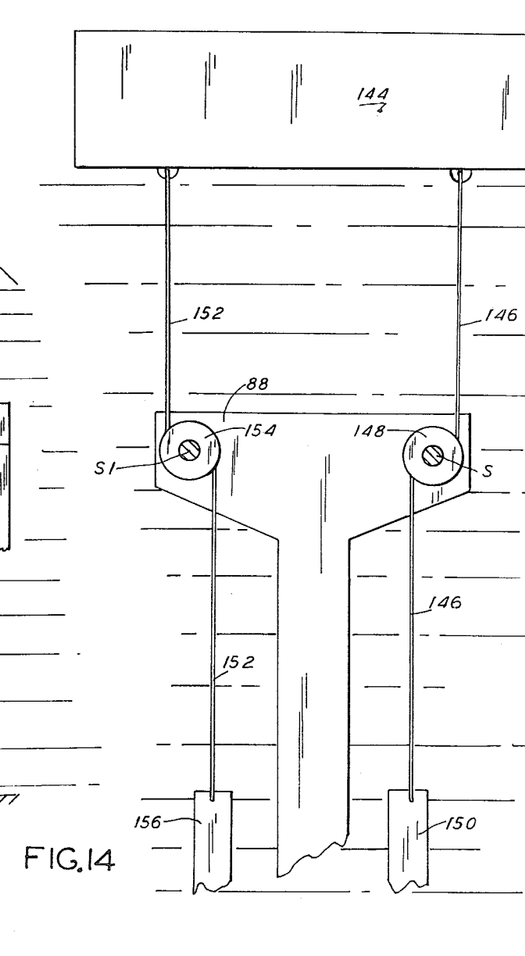
FIG. 14 is a sectional view on the line 14—14 of FIG. 13.

In FIGS. 12, 13 and 14 is illustrated a further embodiment of the cable and float construction. FIG. 12 is a plan view substantially indentical to FIG. 1 with identical parts bearing identical reference numerals. With reference to radial arm unit R1, the outer float 144 is elongated sufficiently to extend transversely well beyond the shafts S and S1. The float 144 is rectangular in cross section, and a first cable 146 is attached to the bottom of the float and around a one way clutch in drum 148, on shaft S, the clutch having been described hereinbefore. The cable 146 extends from the clutch and is connected to the weight 150. A second cable 152 is attached to the bottom of the float 144 and extends around a one way clutch in drum 154 on shaft S1, the cable 152 being parallel to cable 146. Cable 152 extends from the clutch drum 154 and is connected to the weight 156.

A first inner float 158 is identical in construction and in its connection with the shafts S and S1 and weights except that the float 158 is less in length than float 144. Also provided is a second inner float 160 ,also identical in construction and in its connection with the shafts S and S1 and weights except that float 160 is less in length than float 158. A fourth and last inner float 162 is provided, identical in construction and in its connection with shafts S and S1 and weights except that float 162 is less in length that float 160. It will thus be seen that the floats are graduated in length from outer to inner so as to take maximum advantage of the area between the radial arms R1 - R8 and the wave action therebetween. The remaining radial arm units R2 - R8 of FIG. 12 are identical to radial arm unit R1 of FIG. 12.

OPERATION

With the apparatus complete, operative and in position in the water, waves indicated as W, FIGS. 2 and 13, cause the floats to rise, and the floats subsequently fall in the troughs between the waves. As each float rises each cable is drawn upwardly with the weight thereon, with the drum and ratchet and dog thereof rotating the shaft, and then as the float falls in a trough between the waves, the weights fall with no effect on the shafts. Each pair of shafts in a radial arm operates an electrical generator from which power is relayed to shore, as shown and described.

Having thus described the invention, what is claimed as new and desired to be secured by Letters Patent is:

1. An apparatus for producing electrical energy from multidirectional water wave action comprising:
 (a) a central support member having means at the lower end thereof for supporting the same on the bottom of a body of water with the support extending vertically above the surface of the water,
 (b) means for adjusting the vertical dimension of said central support,
 (c) a multiplicity of shafts,
 (d) each of said shafts extending radially from said central support,
 (e) vertical means supporting said shafts horizontally and spaced from the bottom of the body of water,
 (f) means for adjusting the vertical dimension of said vertical supporting means,
 (g) a multiplicity of floats for each of said shafts,
 (h) an elongated member connected at the upper end to each of said floats and in engagement with, (i) a weight connected to the lower end of each of said elongated members and extending below said shaft, (j) clutch means mounted on each of said shafts and associated with each of said elongated members intermediate the ends thereof adapted to rotate each shaft in one direction when said float raises on a wave and not affect said shafts when said floats lower in a trough between waves, (k) means connecting each of said shafts with, (l) electrical generating means to actuate the same.

2. The apparatus of claim 1 in which said shafts are in parallely disposed pairs.

3. The apparatus of claim 1 in which said electrical generating means is carried by said tower.

4. The apparatus of claim 1 in which said means for adjusting the vertical dimension of said central support includes a hydraulic ram means carried by said central support.

5. The apparatus of claim 4 in which said means for adjusting the vertical dimension of said vertical supporting means for said shafts includes hydraulic ram means carried by said vertical supporting means.

6. The apparatus of claim 2 in which each elongated member of said parallely disposed pairs of shafts is connected to a single float.

7. The device of claim 6 in which the lateral extent of said floats is progressively decreased from one end of the shaft to the other end towards said central support.

8. The device of claim 1 in which the lateral extent of said floats is progressively decreased from one end of the shaft to the other towards said central support.

9. The device of claim 1 in which said means connecting each of said shafts with said electrical generating means to actuate the same includes drive members carried by said central support.

10. The device of claim 2 in which said means connecting each of said shafts with said electrical generating means to actuate the same includes drive members carried by said central support.

11. Apparatus for producing electrical energy from wave action of a body of water comprising:

(a) a central support member having means at the lower end thereof for supporting the same on the bottom of a body of water, said central support extending vertically above the surface of the water, (b) a plurality of shaft assemblies extending radially from said central support member in arcuately spaced relation, each shaft assembly including a plurality of operatively coupled and radially aligned shaft segments, (c) means supporting said shaft assemblies generally horizontally, (d) a float member associated with each of said shaft segments, (e) a cable connected at its upper end to said float, and at its lower end to a counterweight, (f) clutch means mounted on each of said shaft segments, said cable extending around said clutch means, said clutch means being provided with means for rotating said associated shaft segment in one direction when the associated float member rises and not rotating said shaft when said associated float member drops in a trough between waves, whereby said shaft assembly is rotated, and (g) electrical generating means, and means for operatively connecting each of said shaft assemblies to said generating means.

* * * * *